Figure 1:
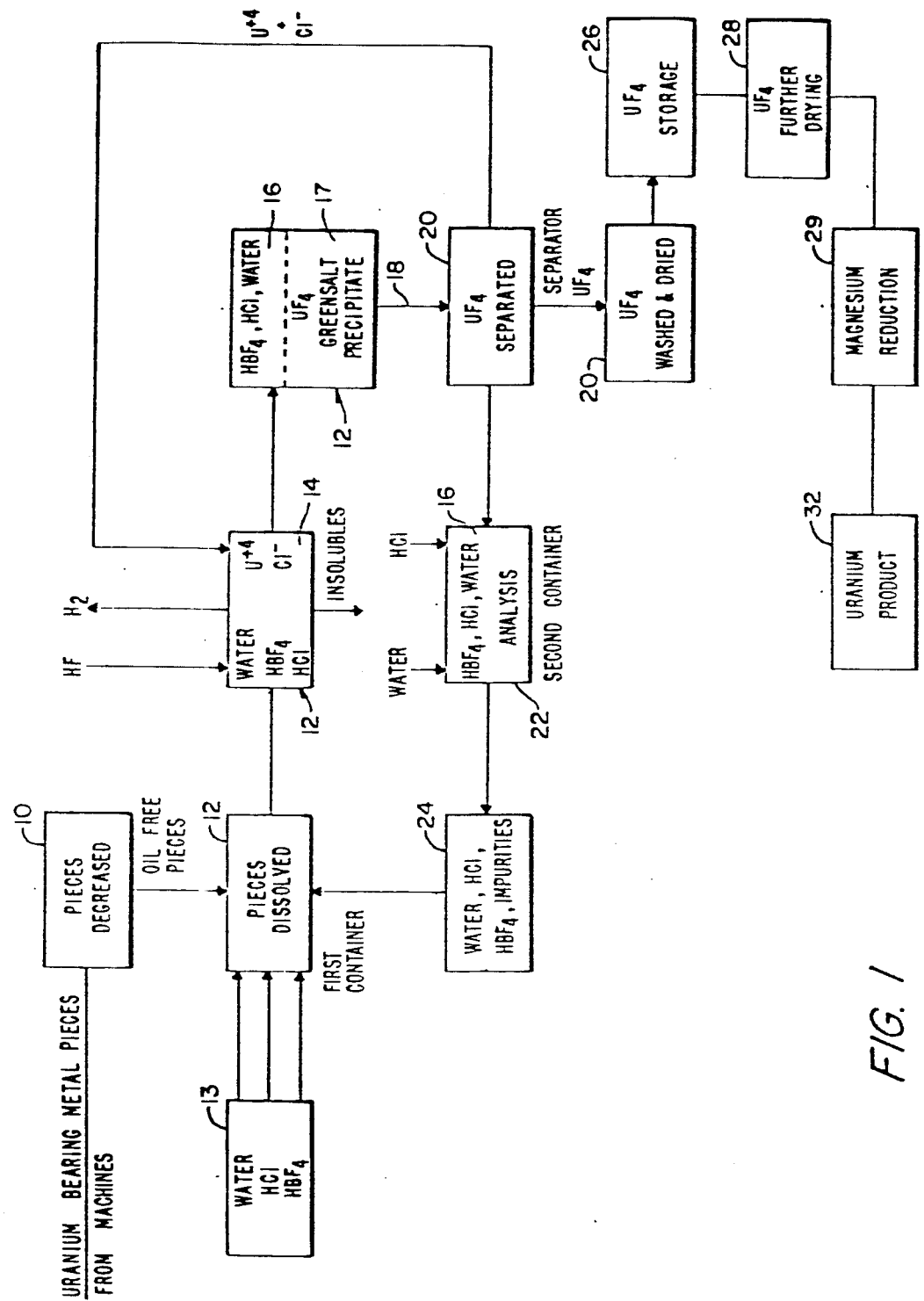

United States Patent [19]
Pollock

[11] Patent Number: 4,837,375
[45] Date of Patent: * Jun. 6, 1989

[54] METHOD FOR PRODUCING GREEN SALT (UF$_4$) FROM URANIUM AND URANIUM ALLOY PIECES

[75] Inventor: Eugene N. Pollock, Brookline, Mass.

[73] Assignee: Nuclear Metals, Inc., Concord, Mass.

[*] Notice: The portion of the term of this patent subsequent to Oct. 13, 2004 has been disclaimed.

[21] Appl. No.: 5,011

[22] Filed: Jan. 20, 1987

Related U.S. Application Data

[63] Continuation-in-part of Ser. No. 723,302, Apr. 15, 1985, Pat. No. 4,699,769.

[51] Int. Cl.$^4$ ............................................ C01O 43/06
[52] U.S. Cl. ...................................... 423/20; 423/259
[58] Field of Search ............... 423/259, 258, 260, 254, 423/253

[56] References Cited

U.S. PATENT DOCUMENTS

| | | | |
|---|---|---|---|
| 2,689,165 | 9/1954 | Harvey | 423/259 |
| 2,768,872 | 10/1956 | Klein et al. | 423/259 |
| 2,849,285 | 2/1958 | Kennedy et al. | 423/260 X |
| 3,030,175 | 4/1962 | Magner et al. | 423/259 X |
| 3,175,879 | 3/1965 | Townend et al. | 423/259 X |

Primary Examiner—Edward A. Miller
Assistant Examiner—Susan Wolffe
Attorney, Agent, or Firm—Joseph S. Iandiorio; Douglas E. Denninger

[57] ABSTRACT

A method and apparatus are provided for producing green salt (UF$_4$) from uranium-bearing metal pieces. The uranium-bearing metal pieces are dissolved in a first aqueous solution containing hydrochloric acid and between 0.5% and 5% fluoboric acid to provide a second aqueous solution which includes uranium (U$^{+4}$), chlorine ions (Cl$^-$) and hydrochloric and fluoboric acids. Hydrofluoric acid is added to the second aqueous solution to precipitate green salt out of that solution and provide a third aqueous solution which contains hydrochloric acid. The green salt is then separated from the third aqueous solution.

18 Claims, 2 Drawing Sheets

4,837,375

METHOD FOR PRODUCING GREEN SALT (UF₄) FROM URANIUM AND URANIUM ALLOY PIECES

CROSS REFERENCE TO RELATED APPLICATION

This application is a continuation-in part of U.S. patent application Ser. No. 723,302 filed Apr. 15, 1985, now U.S. Pat. No. 4,699,769.

FIELD OF INVENTION

This invention relates to a method and apparatus for producing green salt ($UF_4$) from uranium and uranium-bearing metal pieces and to a green salt ($UF_4$) product produced according to that method.

BACKGROUND OF INVENTION

It is presently difficult and expensive to dispose of uranium and uranium alloy (e.g., uranium-titanium, uranium-molybdenum) chips obtained from machining operations. The chips must first be cleaned and dried. Water must be totally removed because water reacts with the uranium leaving hydrogen ($H_2$) which presents an explosive hazard. The uranium and uranium alloy chips may then be compacted into discs to reduce volume and exposed surface area of the chips to oxidation. Groups of these discs are encapsulated in copper cans and crushed again. The copper can encloses the uranium further limiting the surface area of the uranium to oxidation. These crushed copper cans are then buried in designated waste sites.

The above disposal procedures are complex and expensive. Moreover, approximately 50% of the uranium material present at the beginning of the machining operation is buried and lost. Valuable resources are therefore wasted.

SUMMARY OF INVENTION

It is therefore an object of this invention to provide a method and apparatus for producing green salt ($UF_4$) from uranium and uranium-bearing metal pieces which enables uranium to be retrieved for reuse from waste metals and machine scraps.

It is a further object of this invention to provide a method and apparatus for producing green salt which enables valuable uranium to be used more efficiently and completely and which reduces the expense, waste, and inconvenience associated with the conventional disposal of uranium and uranium alloy waste.

It is a further object of this invention to provide a quick, inexpensive and effective method for recycling uranium-bearing metal pieces which eliminates the need for crushing and drying those pieces.

It is a further object of this invention to provide a method for producing green salt which uses fluoboric acid as a catalyst to dissolve uranium and limit the amount of sludge formed.

It is a further object of this invention to provide a method and apparatus for producing green salt from uranium-bearing metal pieces which employs a relatively dilute acid.

It is a further object of this invention to provide a method and apparatus for effectively removing metal impurities from uranium and uranium alloy pieces.

It is a further object of this invention to provide a high purity green salt product produced according to the method of this invention.

This invention features a method of producing green salt ($UF_4$) from uranium-bearing metal pieces which includes dissolving the uranium-bearing metal pieces in a first aqueous solution containing hydrochloric acid and fluoboric acid with a concentration of at least 0.5% but no more than 5.0% to provide a second aqueous solution which includes uranium ($U_{+4}$), chloride ions ($Cl^-$) and hydrochloric and fluoboric acids. Hydrofluoric acid (HF) is added to the second aqueous solution to precipitate green salt out of the second solution and provide a third aqueous solution containing hydrochloric acid. The green salt is then separated from the third aqueous solution.

In a preferred embodiment the first aqueous solution may include a concentration of at least 0.5% but no more than 2% fluoboric acid. Although dissolution of the uranium pieces may be accomplished with hydrochloric acid concentration of 50% or more, the first aqueous solution preferably includes no more than a 25% concentration of hydrochloric acid. Insoluble materials in the second solution may be removed and hydrogen gas released as the uranium-bearing metal pieces are dissolved in the first solution may be removed from the container through a vent.

An aqueous solution of hydrofluoric acid may be added to the second aqueous solution to precipitate green salt ($UF_4$) out of the second solution and provide a third aqueous solution containing at least hydrochloric acid. Alternatively, gaseous hydrofluoric acid may be added. To assist with the precipitation the hydrofluoric acid may be stirred into the second solution. The green salt precipitate may be separated by centrifuging or by filtering.

Following the separation of the green salt precipitate from the third aqueous solution the precipitate may be washed and dried for further reprocessing. The third aqueous solution may be analyzed for acid content and water, hydrochloric acid, and/or fluoboric acid may be added to the third aqueous solution. The third aqueous solution containing hydrochloric acid may be used as at least a portion of the first aqueous solution to dissolve successive uranium-bearing metal pieces.

This invention also features a green salt product produced according to the method of this invention. Further featured is an apparatus for producing green salt from uranium-bearing metal pieces. There are first container means for dissolving uranium-bearing metal pieces in a first aqueous solution which includes hydrochloric acid and fluoboric acid in the above concentration to provide a second aqueous solution which includes uranium ($U^{+4}$), chloride ions and hydrochloric and fluoboric acids. The container means also receives hydrofluoric acid to precipitate green salt out of the second solution and provide a third solution which includes hydrochloric and fluoboric acids. There are separator means connected to the first container means through a first conduit means for receiving the precipitate and the third solution and separating the precipitate from the third solution. Second container means are connected to the separator means through second conduit means for receiving third solution from the separator means. Third conduit means are connected between the second container means and the first container means and there are means for moving the third aqueous solution through the third conduit means from the second container means to the first container means to reintroduce the third solution in the first solution.

Preferably, the apparatus also includes means for removing sludge from the first container means. Vent means may be provided for drawing hydrogen gas from the vicinity of the first container. Second means may be provided for moving the third solution through the first conduit means. There may be means communicably connected with the separator means for receiving green salt therefrom. The first container means may include a reaction tank and the separator means may include a filter press.

DISCLOSURE OF PREFERRED EMBODIMENT

Figure 2:
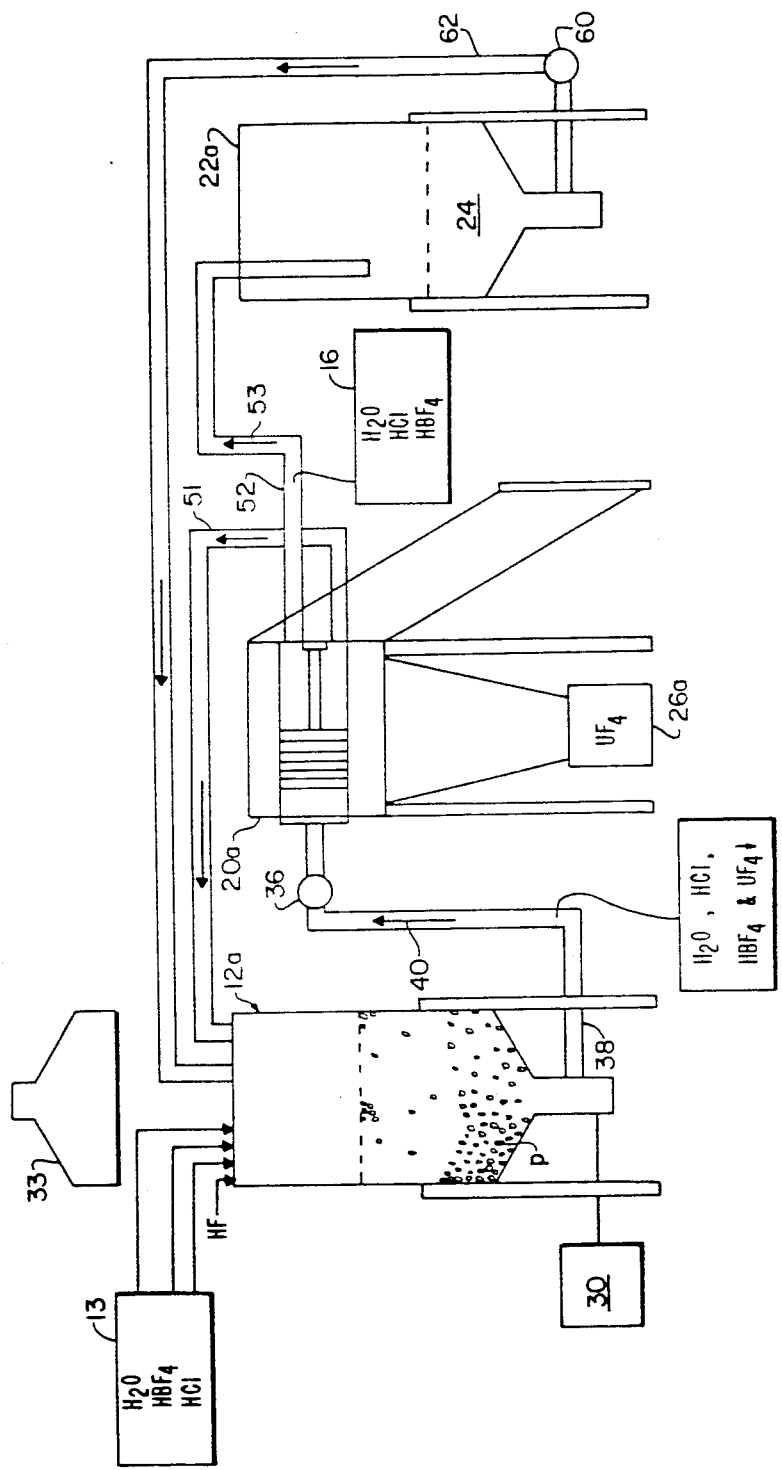

Other objects, features and advantages will occur from the following description of the preferred embodiment and the accompanying drawings, in which:

FIG. 1 is a diagram of a method for producing green salt from uranium-bearing metal pieces according to this invention; and FIG. 2 is an elevational, partly schematic view of an apparatus for producing green salt from uranium-bearing metal pieces according to this invention.

A method and apparatus for producing green salt (uranium tetrafluoride) from uranium-bearing metal pieces according to this invention may be accomplished by dissolving pieces of uranium or uranium alloy in a first container holding a first aqueous solution which includes typically 25% or less hydrochloric acid. The pieces are usually chips, scraps, or fines formed form the machining or grinding of uranium or uranium alloys such as U-Ti or U-Mo. Such pieces can be dissolved rapidly in hydrochloric acid having concentration of 35% or stronger. However, such high concentrations make the dissolution difficult to control due to the exothermic nature of the reaction. Additionally, approximately 20% of the metal produces a sludge (such as hydrated uranium oxide) which cannot be dissolved without the addition of an oxodizing agent such as nitric acid ($HNO_3$). The use of such an agent produces an undesired uranyl ion ($UO_2^{2+}$) which does not permit the formation of green salt.

Accordingly, a small concentration (e.g., at least 0.5% but no more than 5%) of fluoboric acid ($HBF_4$) is included in the first aqueous solution. The fluoboric acid limits the formation of the undesirable sludge and acts as a catalyst to permit the rapid and controlled dissolution of the metal or metal alloy with a more dilute, e.g., 10%, concentration of hydrochloric acid. Enhanced control over the dissolution of the uranium-bearing metal pieces is thereby achieved. In contrast, it was disclosed in the parent application, Ser. No. 723,302, that the concentration of fluoboric acid should be limited to no greater than 2.0%. The pieces dissolve into a second aqueous solution which includes uranium ($U^{+4}$), chloride ions ($Cl^-$), hydrochloric acid, and fluoboric acid. Alloy metals such as titanium or molybdenum, if present, are also dissolved in the second solution. Insoluble materials such as refractory oxides drop to the bottom of the first container and may be eliminated by bottom draining or coarse filtration. One such apparatus for performing such removal is the JWI Filter Press Model 470. The dissolution of the uranium-bearing pieces also liberates hydrogen ($H_2$) which is vented from the vicinity of the container.

Hydrofluoric acid (HF) either in aqueous solution or gaseous form is added to the second aqueous solution and green salt ($UF_4$) is therefore precipitated out of that solution. To encourage such precipitation the hydrofluoric acid may be stirred into the second solution. A third aqueous solution containing hydrochloric and fluoboric acids is thereby provided and that solution and the green salt precipitate it contains are moved, typically through a conduit to separator means for separating the green salt from the third aqueous solution. The third aqueous solution is then delivered to a second container through a second conduit wherein the acid content of the third aqueous solution may be analyzed. Water, hydrochloric acid and/or fluoboric acid may be added to the third aqueous solution to bring those constituents to approximately the level of the first aqueous solution. The third aqueous solution, which also includes any metals such as titanium or molybdenum dissolved in the first container, is moved as required through a third conduit from the second container back to the first container where it may be utilized as, or in combination with, the first aqueous solution to dissolve successive loads of uranium-bearing metal pieces.

The green salt is washed with water to reduce impurities and is at least partially dried. It may then be removed from the separator means and stored in drums or similar containers. Eventually, the green salt may be further dried and employed in magnesium reduction processing to make uranium (metal derby).

The first container may include a reaction tank. A preferred acceptable tank is made by Perry Products Corp. The separator means may include a press filter such as the JWI Filter Press Model 470, a centrifuge or other such solids/liquid separation apparatus. Typically the second container is a filtrate tank such as that manufactured by Perry Products Corp. Conventional pumps may be employed to move the solutions between the containers and separator means.

The following example is provided to illustrate the quantities of materials and chemicals and the times which may be employed in the process of this invention. These values, however, are provided for illustrative purposes only. The process of this invention is limited only by the claims.

The first aqueous solution may include 90 gallons of water, 10 gallons of hydrochloric acid and 0.6 gallons of fluoboric acid. To this solution 100 lbs. of oil-free uranium and/or uranium alloy scrap may be added at a rate which limits the exothermic reaction temperature to 160° F. The pieces are added until dissolution is complete. Seven gallons of hydrofluoric acid, having a concentration of 49% may then be added to the second aqueous solution. The solution is stirred for an hour until the green salt ($UF_4$) has completely precipitated out of solution. After separation of green salt from the third aqueous solution that solution is analyzed for losses in hydrochloric acid and water. The required amount of each is added to bring the solution to a level of 100 gallons and a 10% concentration of hydrochloric acid. The solution may then be recycled for use in dissolving an additional 100 lbs. of uranium and/or uranium alloy scrap. Recycling may be continued until metal impurities (e.g., Fe, Ni, Cu, Si, Ti and Mo) reach undesirably high levels. Those levels may vary according to the intended uses for the recycled green salt. A small amount of the first solution maybe disposed of before it is recycled to maintain the impurity level within the desired limits.

There is shown in FIG. 1 a method for producing green salt from uranium-bearing metal chips according to this invention. Machined and lubricated uranium, and/or uranium alloy pieces are introduced into a centrifuge 10 where they are washed in water to remove the lubricant and then centrifuged to remove excess water. The oil-free pieces are then introduced into a first container 12 which contains an aqueous solution 13 of hydrochloric acid (HCl) having a concentration of 10% or less and fluoboric acid (HBF$_4$) having a concentration of 0.5 to 1%. The concentration of fluoboric acid may be selectively increased to as high as 5.0%. The pieces are dissolved in solution 13 to provide a second aqueous solution 14 according to the following equation:

Aqueous solution 14 includes water, hydrochloric and fluoboric acids, uranium (U$^{+4}$) and chloride ions (Cl$^-$). It also includes dissolved alloy metals such as titanium and molybdenum present in the metal pieces. Hydrogen gas H$_2$ is liberated by the reaction. Insoluble oxides may be removed from the bottom of container 12. The presence of fluoboric acid prevents the formation of sludge and catalyzes the reaction.

Hydrofluoric acid (HF) is then added to solution 14 within container 12. The hydrofluoric acid reacts with the second solution 14 according to the following formula:

This reaction may be encouraged by stirring the hydrofluoric acid for up to an hour. Green salt (UF$_4$) 17 is therefore precipitated out of solution 14 to provide a third aqueous solution 16. The green salt 17 and solution 16 are then delivered as indicated by arrow 18 to separator 20 wherein the green salt is separated from solution 16. Any U$^{+4}$ and Cl$^-$ remaining in the solution are separated and returned to container 12. Solution 16 is delivered to a second container 22 where its acid and water content are analyzed. The free acid level is typically determined by titration with a standard base (e.g., 0.5 NaOH). The water level is determined by total volume in container 22. Acid and water may be added to bring their respective levels to those of aqueous solution 11. A solution 24 is thereby provided which includes each of the constituents and concentrations of solution 11 with the possible addition of dissolved metal impurities (e.g., titanium, molybdenum).

Following separation of the green salt from third solution 16 the green salt may be washed with water in the separator 20 to reduce impurities such as Cu, Ni, Fe, Si, Ti, and Mo. The green salt is then partially dried by back-flushing with air and is removed from separator 20 and stored as at 26. Subsequently the green salt may be dried further at 28 and subjected to the magnesium reduction process 30 to provide recycled uranium (metal derby) 32.

An apparatus for accomplishing the method of this invention is shown more clearly in FIG. 2. Aqueous solution 11, including hydrochloric and fluoboric acid, and uranium-bearing pieces P are introduced into a reaction tank 12a and pieces P are dissolved in solution 11. Refractory oxides or other undesirable insoluble materials dropped to the bottom of tank 12a and are drained or filtered by filter 30. Hydrogen H$_2$ gas is also liberated by the reaction and vented from the vicinity of tank 12 by hood 32.

Hydrofluoric acid (HF) is added to the solution in tank 12a thereby causing green salt UF$_4$ to precipitate out of the solution. An aqueous solution including hydrochloric and fluoboric acids and green salt precipitate are pumped by pump 36 through a conduit 38 in the direction of arrow 40 to a filter press 20a. There the aqueous solution is separated from the green salt. The green salt may be washed and dried in filter press 20a and then deposited in a storage container 50. Uranium U$^{4+}$ and chloride ions (Cl$^-$) remaining in the solution are also separated by press 20a and returned to container 12a via conduit 51.

The aqueous solution 16 is delivered by conduit 52 in the direction of arrow 53 to a filtrate tank 22a. The acid level of the filtrate (e.g., the aqueous solution in tank 22a) is analyzed and water and/or acid are added to bring their levels to those of the first aqueous solution 11. Filtered solution 24 is then pumped as needed by a pump 60 through conduit 62 back to reaction tank 12a where it may be employed to dissolve subsequent batches of uranium-bearing pieces.

The apparatus disclosed is only one example of an apparatus which may be used to practice this invention. This invention is not limited to the illustrated apparatus and may be practiced on various alternative apparatuses.

Although specific features of the invention are shown in some drawings and not in others, this is for convenience only as each feature may be combined with any or all of the other features in accordance with the invention.

Other embodiments will occur to those skilled in the art and are within the following claims.

What is claimed is:

1. A method of producing green salt (UF$_4$) from uranium-bearing metal pieces comprising:

dissolving the uranium-bearing metal pieces in a first aqueous solution containing hydrochloric acid and at least 0.5% but no more than 5.0% fluoboric acid to provide a second aqueous solution which includes uranium (U$^{+4}$), chloride ions and hydrochloric and fluoboric acids;

adding hydrofluoric acid to said second aqueous solution to precipitate green salt out of said second solution and provide a third aqueous solution containing hydrochloric acid; and separating said green salt from said third aqueous solution.

2. The method of claim 1 in which said first aqueous solution includes no more than 50% hydrochloric acid.

3. The method of claim 1 in which said first aqueous solution includes no more than 25% hydrochloric acid.

4. The method of claim 1 in which an aqueous solution of hydrofluoric acid is added to said second aqueous solution.

5. The method of claim 1 in which gaseous hydrofluoric acid is added to said second aqueous solution.

6. The method of claim 1 in which said green salt precipitate is separated by centrifuging.

7. The method of claim 1 in which said green salt precipitate is separated by filtering.

8. The method of claim 1 in which said hydrofluoric acid is stirred into said second solution.

9. The method of claim 1 further including washing said green salt precipitate following its separation from said third aqueous solution.

10. The method of claim 9 further including drying said washed green salt precipitate.

11. The method of claim 1 further including using said third aqueous solution containing hydrochloric acid as at least a portion of said first aqueous solution to dissolve successive uranium-bearing metal pieces.

12. The method of claim 1 further including analyzing the acid content of said third aqueous solution.

13. The method of claim 11 further including adding water to said third aqueous solution following separation of said green salt and using said third solution in said first solution to dissolve successive uranium-bearing metal pieces.

14. The method of claim 11 further including adding hydrochloric acid to said third aqueous solution.

15. The method of claim 11 further including adding fluoboric acid to said third aqueous solution following separation of said green salt and using said third solution in said first solution to dissolve successive uranium-bearing metal pieces.

16. The method of claim 1 further including removing insoluble materials from said second aqueous solution.

17. The method of claim 1 further including venting hydrogen gas released as the uranium-bearing metal pieces are dissolved in the first solution.

18. A method of producing green salt ($UF_4$) from uranium-bearing metal pieces comprising:

dissolving said uranium-bearing metal pieces in a first aqueous solution containing hydrochloric acid and at least 0.5% but no more than 5.0% fluoboric acid to provide a second aqueous solution containing uranium ($u^{+4}$), chloride ions and hydrochloric and fluoboric acids;

removing insoluble materials from said second solution;

adding hydrofluoric acid to said second solution to precipitate green salt out of said second aqueous solution and provide a third aqueous solution containing hydrochloric and fluoboric acids; and separating said green salt from said third aqueous solution.

* * * * *